(12) United States Patent
Chreene et al.

(10) Patent No.: US 7,437,824 B2
(45) Date of Patent: Oct. 21, 2008

(54) ADJUSTABLE SHOE ASSEMBLY FOR A RECIPROCATING SAW

(75) Inventors: David Chreene, New Freedom, PA (US); Bradley J. Mealy, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 338 days.

(21) Appl. No.: 11/167,459

(22) Filed: Jun. 27, 2005

(65) Prior Publication Data

US 2006/0288591 A1    Dec. 28, 2006

(51) Int. Cl.
B27B 9/02        (2006.01)
B27B 21/08       (2006.01)

(52) U.S. Cl. .............................. 30/377; 30/392; 403/324

(58) Field of Classification Search .................... 30/374, 30/377, 392–394, 340, 376; 16/405; 248/132, 248/149, 157; 403/323, 324; D8/64
See application file for complete search history.

(56) References Cited

U.S. PATENT DOCUMENTS

| 3,360,021 | A | * | 12/1967 | Mejia | ........................... 30/392 |
| 3,496,972 | A | * | 2/1970 | Rees | ........................... 30/377 |
| 5,007,172 | A | | 4/1991 | Palm | |
| 5,421,091 | A | | 6/1995 | Gerritsen, Jr. | |
| 5,724,741 | A | | 3/1998 | Bednar | |
| 5,855,070 | A | | 1/1999 | Grabowski | |
| 6,272,757 | B1 | | 8/2001 | Roe | |
| 6,308,423 | B1 | | 10/2001 | Ono | |
| 6,317,988 | B1 | | 11/2001 | Tachibana et al. | |
| 6,502,317 | B2 | | 1/2003 | Dassoulas et al. | |
| 6,810,589 | B2 | * | 11/2004 | Lagaly et al. | .................. 30/392 |
| 6,851,193 | B2 | * | 2/2005 | Bednar et al. | .................. 30/377 |
| D524,132 | S | * | 7/2006 | Welsh | ........................... D8/64 |
| 7,082,689 | B2 | * | 8/2006 | Beville et al. | .................. 30/377 |
| 7,188,425 | B2 | * | 3/2007 | Bednar et al. | .................. 30/377 |
| 2001/0034941 | A1 | | 11/2001 | Bednar et al. | |
| 2002/0014014 | A1 | | 2/2002 | Dassoulas et al. | |
| 2004/0049928 | A1 | | 3/2004 | Phillips et al. | |
| 2004/0187321 | A1 | * | 9/2004 | Hartmann et al. | .............. 30/377 |
| 2005/0183271 | A1 | * | 8/2005 | Sugiura et al. | ................. 30/392 |
| 2005/0246905 | A1 | * | 11/2005 | Tozawa et al. | ................. 30/392 |
| 2007/0251104 | A1 | * | 11/2007 | Heinrichs et al. | ............. 30/392 |

FOREIGN PATENT DOCUMENTS

EP      1738851 A2  *  1/2007
EP      1852204 A2  *  11/2007

* cited by examiner

*Primary Examiner*—Jason Prone
(74) *Attorney, Agent, or Firm*—Harness, Dickey & Pierce, P.L.C.

(57) ABSTRACT

A reciprocating saw includes a locking mechanism for a shoe of the reciprocating saw. The mechanism includes a lever mounted on the saw body movable to a first position where the saw blade is clamped in place. It also includes a lock pin with a body, a reduced circumference section, and a pin shoulder adjacent the reduced circumference section. The pin has a locked position where the pin shoulder abuts the shoe shoulder whereby the pin locks the shoe in place and an unlocked position where the shoe shoulder may translate through the clearance defined by the reduced circumference section. The lever urges the pin toward the locked position when the lever is in the first position.

17 Claims, 8 Drawing Sheets

ADJUSTABLE SHOE ASSEMBLY FOR A RECIPROCATING SAW

FIELD OF THE INVENTION

The present invention relates in general to power tools. In particular, the present invention relates to shoe assemblies for reciprocating power tools. More specifically, but without restriction to the particular exemplary embodiments and/or use which are shown and described for purposes of illustration, the present invention relates to a reciprocating saw with a locking mechanism for an adjustable shoe assembly.

BACKGROUND OF THE INVENTION

Power reciprocating saws include jigsaws and other reciprocating saws generally referred to in the trade as "recip" saws. These saws incorporate reciprocating shafts for driving generally linear saw blades along a predetermined path so as to provide one of a rectilinear or orbital cutting action.

In a conventional manner, the saw blades used with such power tools are attached to the reciprocating drive shafts through a blade holder having a slot for receiving the saw blade and a set screw which is received in a hole in the blade. The blade is clamped in place relative to the reciprocating drive shaft through tightening of the set screw. A particularly useful alternative to the set screw includes a clamping lever and a biasing member. The lever cooperates with the biasing member to clamp the blade in place. More particularly, when the lever is placed in its unclamping position it overcomes the biasing member that otherwise maintains the blade against a reciprocating drive shaft.

In addition, reciprocating saws typically include a shoe. The shoe is placed against the workpiece to assist in controlled cutting. The shoe also determines the depth the saw blade will extend through and beyond the work piece. In many known arrangements, the shoe can be adjusted in a direction parallel to the blade. When cutting a piece of plywood the operator may wish to prevent damage to other objects lying below the plywood. Thus, the operator may adjust the shoe to such a position that the blade penetrates and cuts the plywood without damaging the object therebelow.

To be useful an adjustable shoe must be clamped or locked in place. Known adjustment and lock mechanisms sometimes include a post with the following features: a plurality of locking slots; a positioning slot on a face perpendicular to the locking slots; a stop plate; a channel; and a removal slot. An equally complicated plate mechanism cooperates with the post to adjust and lock the shoe in place. Typically the mechanism includes a locking plate, a locking portion, and a positioning portion. A spring biases the lock mechanism in a position wherein the lock mechanism prevents the plate mechanism to lock the shoe in a position selected by the operator. Additionally, a separate mechanism clamps the saw blade in place.

The various slots, plates, channels, and portions each require separate machining, which increases the cost of the tool. Moreover, not only must the operator clamp the blade in place, the operator must also lock the shoe in place, and if removal of the shoe is required the operator must also rotate the post. Accordingly, work with the tool stops while the steps of clamping the blade and locking and removing the shoe take place. Thus, the pace of work slows down thereby imposing further operating costs on the operator. Moreover, as the complexity of the work increases (i.e., the number and frequency of shoe adjustments increases) the greater the work slow down.

Accordingly, a reciprocating saw shoe locking mechanism that is easy and inexpensive to manufacture and convenient to use is desirable.

SUMMARY

The present invention provides a mechanism to lock a shoe of a reciprocating saw in place. More particularly, the present invention provides a shoe locking arrangement for a power reciprocating saw including a common lever to both clamp the saw blade in place and to lock the shoe in place. In one aspect, the lever is pivotally mounted for movement between three stable positions. In the first stable position the lever allows the saw blade to be removed and the shoe height to be adjusted. In the second stable position the lever clamps the saw blade in place yet allows adjustment of the shoe height. In the third stable position the lever clamps the saw blade in place and locks the shoe in place.

In one aspect, the present invention provides a reciprocating saw with a shaft projecting from a front end of an elongated housing. The blade is fixed to the reciprocating shaft by a clamping mechanism at the end of the shaft. Furthermore, the blade projects through a shoe located beyond the end of the shaft. The shoe provides a surface that the tool operator can rest or push against the work piece. In order to adjust the depth of cut, the shoe is mounted in a manner such that its axial position is adjustable. In this manner, the amount of blade projecting beyond the shoe is adjustable. Most commonly, the shoe is mounted at the end of a support rod or other elongated member that is slidably mounted in a track in the tool housing. The track is axially parallel to, but vertically displaced from the reciprocating shaft to which the blade is attached.

Moreover, adjustable shoe assemblies in accordance with the present invention include an elongated support bar that translates in a suitably shaped channel located in the tool housing parallel to but displaced from the reciprocating shaft. The support bar is formed to include a plurality of arcuate grooves that define positive adjustment positions. A locking pin is also mounted in the saw housing perpendicular to the support rod and vertically offset from the axis of the support bar. One end of the pin connects to a button projecting outside the side of the tool housing. The other end similarly extends to the lever on the outside of the tool housing.

The locking pin is transversely movable in the housing between a first position or locked position where it engages the support bar and a second position or unlocked position where it disengages from the support bar. The pin is machined to include a reduced diameter portion that is positioned over the support bar when the pin is in the unlocked position. The reduced diameter portion provides clearance between the pin and the support bar to allow movement of the support bar between the positive positions defined by the arcuate grooves. When the pin is in the locked position, a larger diameter portion of the pin is received into one of the arcuate grooves. Engagement of the pin with one of the arcuate grooves prevents translation of the support bar relative to the tool housing.

Additionally, adjustable shoe assemblies in accordance with the present invention may include a detent ring that remains fixed within the tool housing. The detent ring cooperates with a pair of grooves provided in the pin to positively locate the pin in either the locked position or unlocked position.

In another aspect, the present invention provides a shoe locking arrangement for a power tool of the type including a housing, a saw blade inserted into the housing, and an adjustable shoe for adjusting the height of the saw blade. One lever clamps the saw blade and locks the shoe in place via a pin having a groove and a shoulder. The groove and shoulder define a locked position where the pin shoulder abuts a shoulder on the shoe support. In contrast, in an unlocked position the shoe shoulder may translate through the pin groove thereby allowing adjustment of the shoe height. The single, or common, lever urges the pin toward the locked position while a button urges the pin toward the unlocked position. Moreover, the housing of the tool may have a detent to engage a first smaller groove in the pin when the pin is in the locked position. A second smaller groove may be included on the pin to positively locate the pin in the unlocked position.

In yet another aspect, the present invention provides a shoe locking pin for a power reciprocating saw. The pin includes a body and has an unlocked and a locked position relative to the tool housing. A groove in the pin body allows a shoe shoulder to translate when the pin is in the unlocked position. In the locked position though, a pin shoulder abuts the shoe shoulder thereby locking the shoe in place. Moreover, a first detent in the tool housing engages a first small groove in the pin when the pin is in the locked position, thereby positively locating the pin in the locked position.

Also, the detent may engage a second smaller groove in the pin when the pin is in the unlocked position. Like the first smaller groove, the second smaller groove positively locates the pin in the unlocked position. Moreover, the tool may also have a lever for both clamping the saw blade in place and locking the shoe in place via the pin. A button may also be provided to urge the pin from the locked position.

In another aspect the present invention provides a reciprocating saw including a housing, a drive shaft mounted to the housing for reciprocating motion, and a blade clamping arrangement. The clamping arrangement is secured to the drive shaft for releasably interconnecting a saw blade to the drive shaft. Moreover, the clamping arrangement includes an element movable between a clamped position and an unclamped position.

In one, aspect, the saw also includes an adjustable shoe assembly including an elongated member defining an axis. A shoe is mounted to a first end of the elongated member while a second end of the elongated member is adjustably interconnected to the housing for movement of the shoe along the axis. The adjustable shoe assembly also includes a locking member for selectively securing the elongated member in one of a plurality of predefined positions. For securing the elongated member a lever mounted to the housing moves the locking member from the locked position to the unlocked position. The lever also moves the element from the clamped position to the unclamped position.

In still another aspect, the present invention provides a reciprocating saw including a saw blade, a housing into which the blade is inserted, and a shoe with an aperture for the blade to extend therethrough. Additionally, the shoe moves between a plurality of positions relative to the bit. A pin connected to the housing moves between an unlocked position, and a locked position, to selectively secure the shoe in one of the plurality of positions. A detent in the housing engages a groove in the pin when the pin is in the locked position, whereby the detent positively locates the pin in the locked position.

In another aspect, the invention provides a reciprocating saw including a saw blade, a housing wherein the blade is inserted. The saw further includes a support plate having a key extending therefrom, a support post moveable relative to the housing and including a longitudinal keyway configured for receiving the key, an adjustable shoe mounted on the support post, and a locking member for selectively securing the support post relative to the housing. The locking member is movable between a locked position and an unlocked position.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The present invention provides an improved shoe locking arrangement for a power tool. While shown throughout the drawings in a shoe locking arrangement specifically adapted for a reciprocating saw, those skilled in the art will appreciate that the invention is not so limited in scope. In this regard, the teachings of the present invention will be understood to be readily adaptable for use with other power tools.

Figure 1:
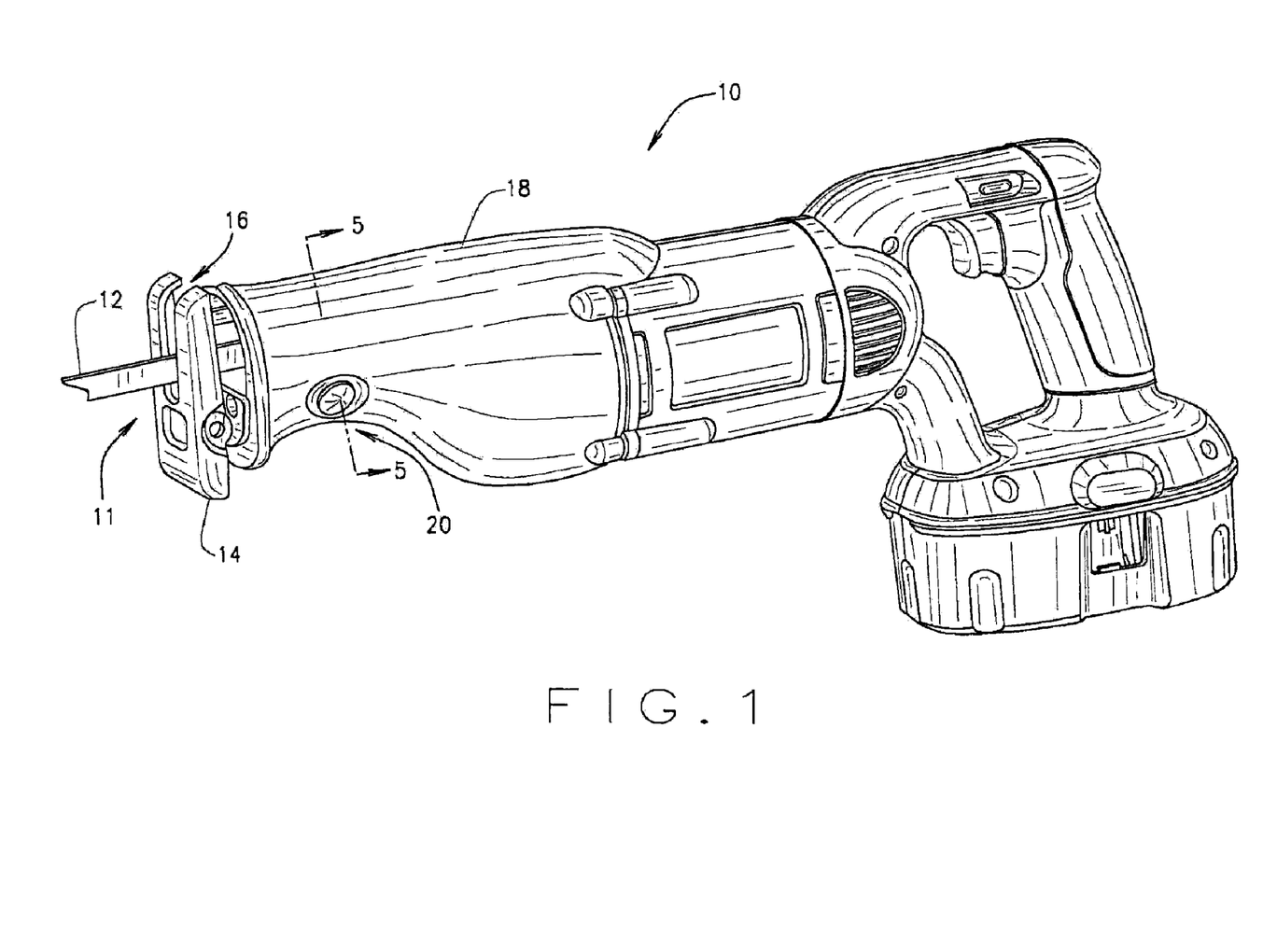
FIG. 1 is a perspective view of a reciprocating saw incorporating a shoe clamping arrangement constructed according to the present teachings.
Figure 2:
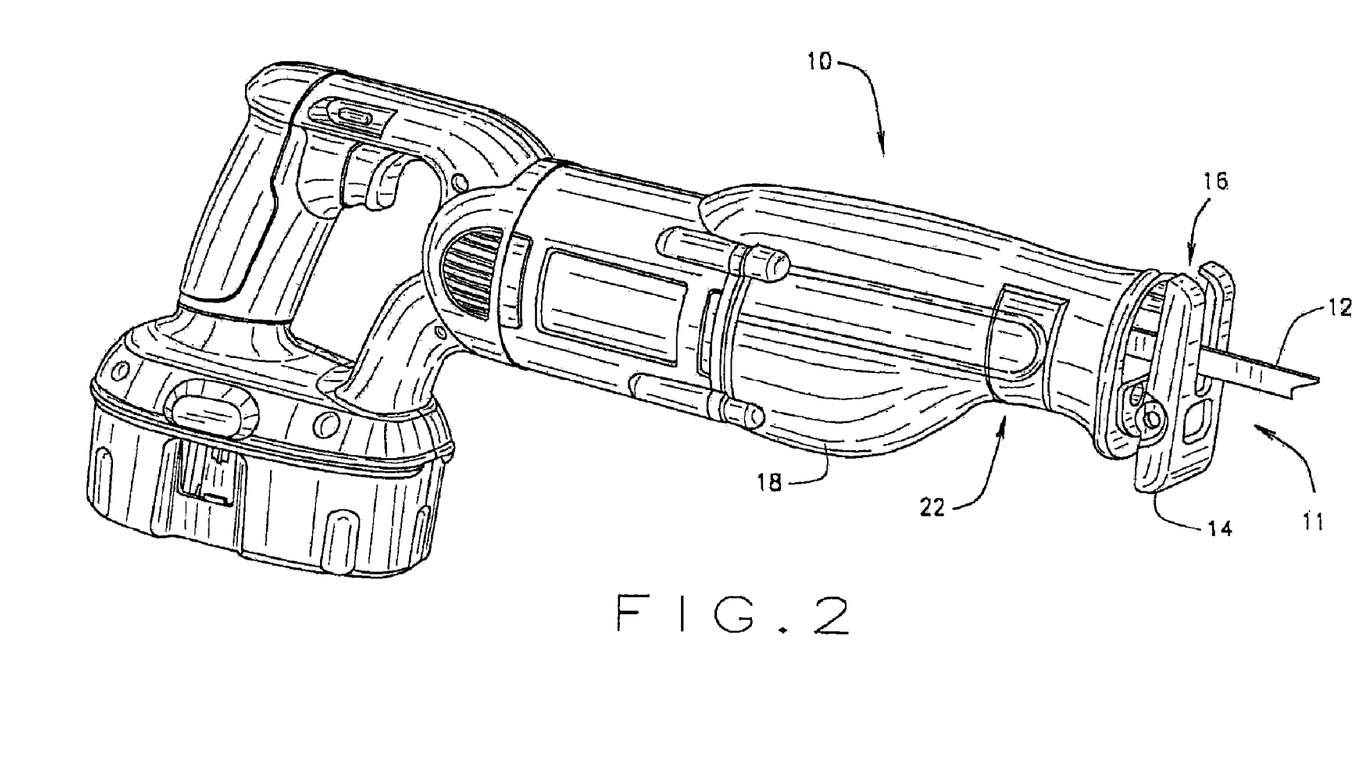
FIG. 2 is another perspective view of the reciprocating saw of FIG. 1.

Turning generally to the drawings in which identical or equivalent elements have been denoted with like reference numerals, and specifically to the perspective views of FIGS. 1 and 2 thereof, an exemplary power tool is shown. The exemplary power tool 10 is illustrated as a reciprocating saw, or jigsaw. The reciprocating saw 10 is illustrated to generally include a saw blade 12, a shoe 14 having an aperture 16 with the blade 12 extending through the aperture 16, and a body or housing 18. Also shown, but not herein discussed, are a conventional hand grip, trigger switch, motor housing, gear case, and other components of the reciprocating saw which are not essential for an understanding of the present invention.

The reciprocating saw 10 is shown to include a blade clamping arrangement for removably securing the saw blade 12 to a reciprocating shaft. The blade clamping arrangement is controlled by a lever 22. In the exemplary embodiment illustrated, the blade clamping arrangement is carried by the shaft and the lever 22 is mounted to the housing. Insofar as the present invention is concerned, it will be understood that the blade clamping arrangement is conventional in construction. One suitable blade clamping arrangement is shown and described in commonly assigned U.S. Pat. No. 6,502,317 issued to Dassoulas et al which is hereby incorporated herein by reference in its entirety.

Also shown in FIG. 2 is an adjustable shoe assembly 11. The adjustable shoe assembly 11 allows a user to adjust the distance by which the blade 12 extends beyond the shoe 14 by moving the shoe between a plurality of pre-selected positions relative to the housing 18. The adjustable shoe assembly 11 is further shown to include a locking arrangement 25 for selectively locking the shoe assembly in one of a plurality of axial positions.

Figure 3:
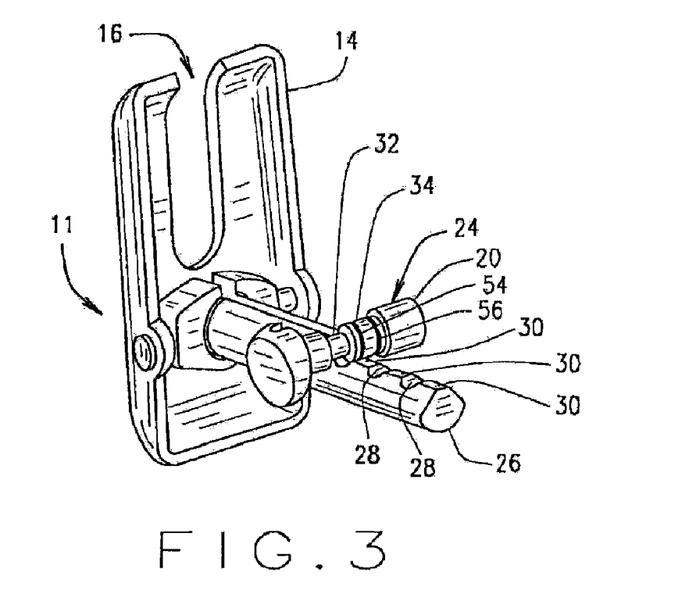
FIG. 3 is a perspective view of a shoe locking arrangement according to the present teachings.

With reference now to FIG. 3, a locking pin 24 and shoe support bar 26 may be seen in relationship to the shoe 14. It should be noted that the housing 18 is not shown for clarity. Though the locking pin 24 is disposed within the housing 18 between the button 20 and the clamping lever 22. The support bar 26 attaches to the shoe 14 at its distal end while its proximal end slides along a suitably shaped opening, or track, in the tip of the housing 18. More particularly, the support bar 26 may move back and forth in the direction indicated by arrow B to adjust its height and for its removal from the reciprocating saw 10. Thus, as the support bar 26 moves, it adjusts the height of the shoe 14 relative to the housing 18. Additionally, along the length of the support bar 26 a plurality of grooves 28 are shown as being separated by shoulders 30.

Approximately perpendicular to the support bar 26, and offset therefrom, the locking pin 24 lies between the button 20 and the clamping lever 22. The locking pin 24 includes at least one groove 32 (or reduced circumference section) and shoulder 34. In FIG. 3, the pin shoulder 34 is shown engaging a shoulder 30 of the support bar 26. Accordingly, the support bar 26 (and the shoe 14) remains locked in place as long as the shoulders 30 and 34 are engaged. Thus, FIG. 3 shows the locking pin 24 in a locked or first position.

Figure 4:
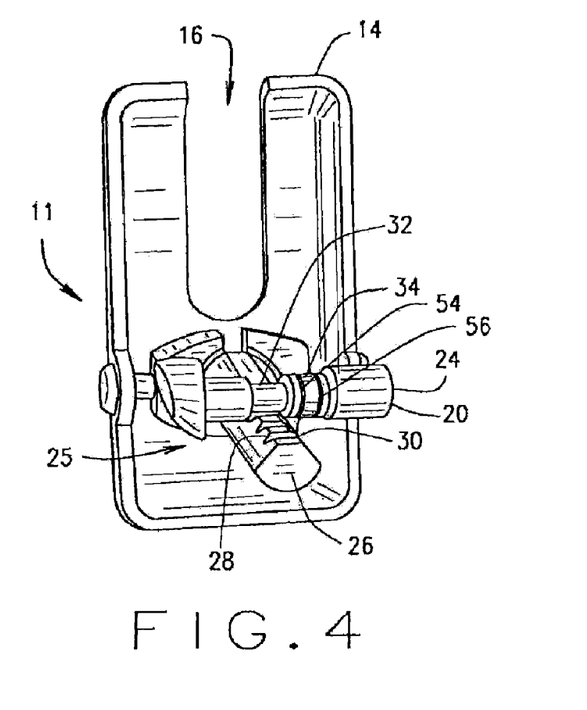
FIG. 4 is another perspective view of the shoe locking arrangement of FIG. 3.

In contrast, FIG. 4 shows a pin groove 32 approximately centered over the support bar 26. Thus, the shoulders 30 and 34 do not engage each other when the pin 24 is in this position. Accordingly, the support bar 26 is free to translate relative to the locking pin 24. Thus, FIG. 4 shows the locking pin 24 in a second or unlocked position wherein the support bar 26 and shoe 14 are unlocked and free to move in relation to the housing 18 and blade 12. In one particular application, the distance between the locked position of the pin 24 of FIG. 3 and the unlocked position of the pin 24 of FIG. 4 is about 4 millimeters.

In addition to clamping and unclamping the blade 12 as discussed in the '317 patent, the lever 22 also serves to lock and unlock the shoe 14. Herein, the term "clamped" will be used when reference is made to securing the blade 12 in place; whereas the term "locked" will be used when reference is made to securing the shoe in place. While the effect of clamping and locking are similar (securing a component in place) it is believed that the distinction will aid the reader in an understanding of the invention.

Figure 5:
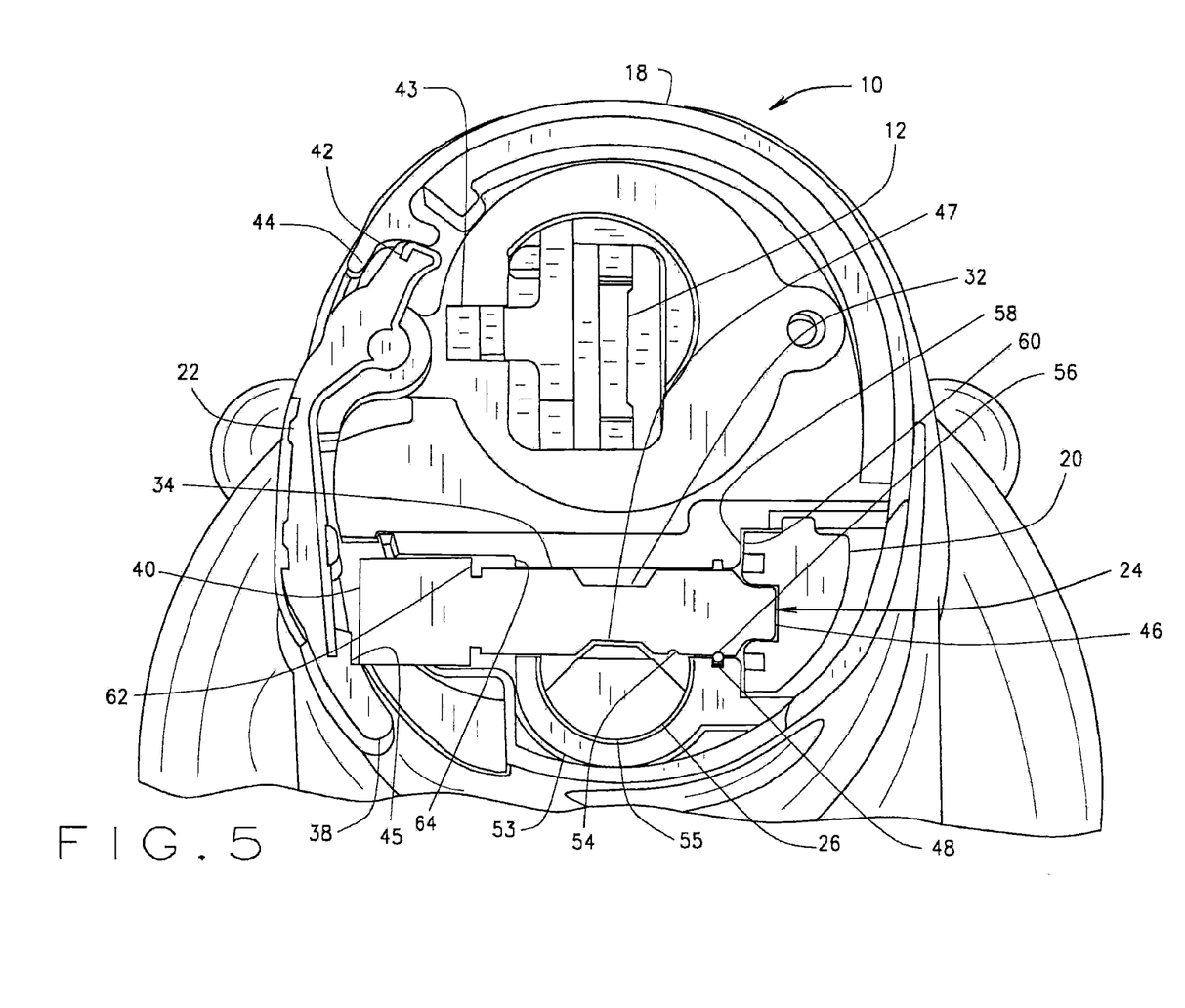
FIG. 5 is a cross-sectional view of a clamping lever arrangement of the present invention taken along the line 5-5 in FIG. 1 illustrating the clamping lever in a unlocked and clamped position.
Figure 6:
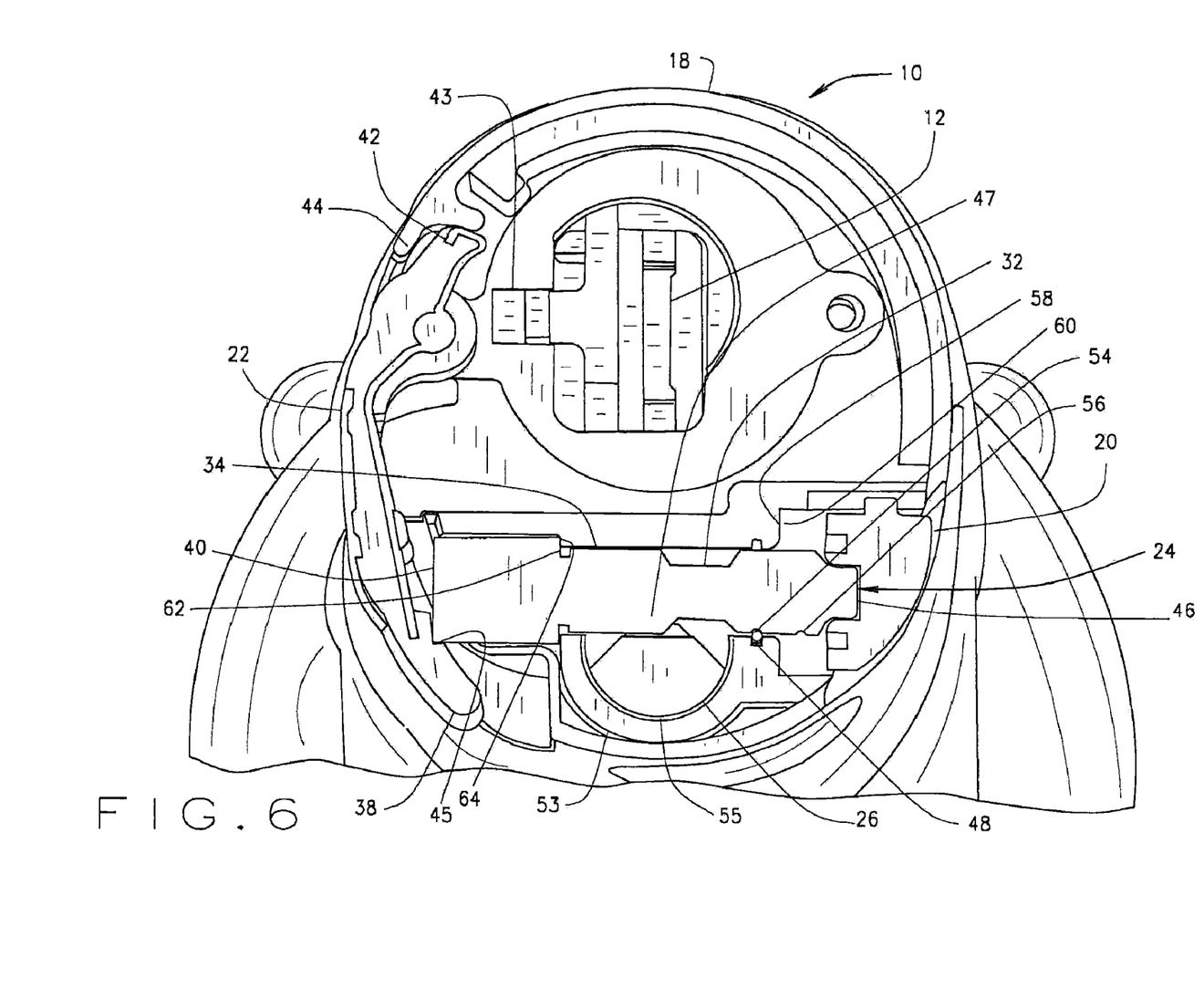
FIG. 6 is a cross-sectional view of the clamping lever arrangement of FIG. 5 illustrating the clamping lever in a locked and clamped position.

With reference to FIGS. 5 and 6 the lever 22 is shown in a clamped and unlocked position and in a clamped and locked (depressed) position, respectively. As noted previously, U.S. Pat. No. 6,502,317 describes a third unclamped and unlocked position in which the proximal end 42 of the lever 22 urges a movable element 43 to clamp the blade 12 in place. With particular reference now to FIG. 5, the lever 22 may be seen in the clamped but unlocked position. Specifically, a distal end 38 of the lever 22 is spaced apart from a proximal end 40 of the locking pin 24. Moreover, the locking pin 24 is situated with the pin groove 32 approximately centered over the support bar 26. With the reduced diameter of the locking pin 24 at the pin groove 32 a clearance 47 is defined to allow the support bar 26 to translate whether or not a shoe support bar shoulder 30 is in the clearance. Accordingly, the operator may move the support bar 26 relative to the locking pin 24 (and the housing 18 and the blade 14) to adjust the longitudinal position of the shoe 14.

In contrast, FIG. 6 shows the clamping lever 22 in the clamped and locked position. Notably, the distal end 38 now abuts the proximal end 40 of the locking pin 24. Additionally, a recess 45 may be provided in the distal end 38 of the lever 22 to receive the proximal end 40 of the locking pin 24. Accordingly, as the lever 22 moves from the clamped and unlocked position to the clamped and locked position it urges the locking pin 24 into the locked position. Specifically, the groove 32 translates away from the support bar 26 while the shoulder 34 translates at least partly across the clearance area 47 in the area where the clearance generally extends around and above the support bar 26 as shown. Also a proximal end 42 of the clamping lever 22 is shown seated against an inside surface 44 of the housing 18 in the fully depressed position of FIG. 6.

Figure 7:
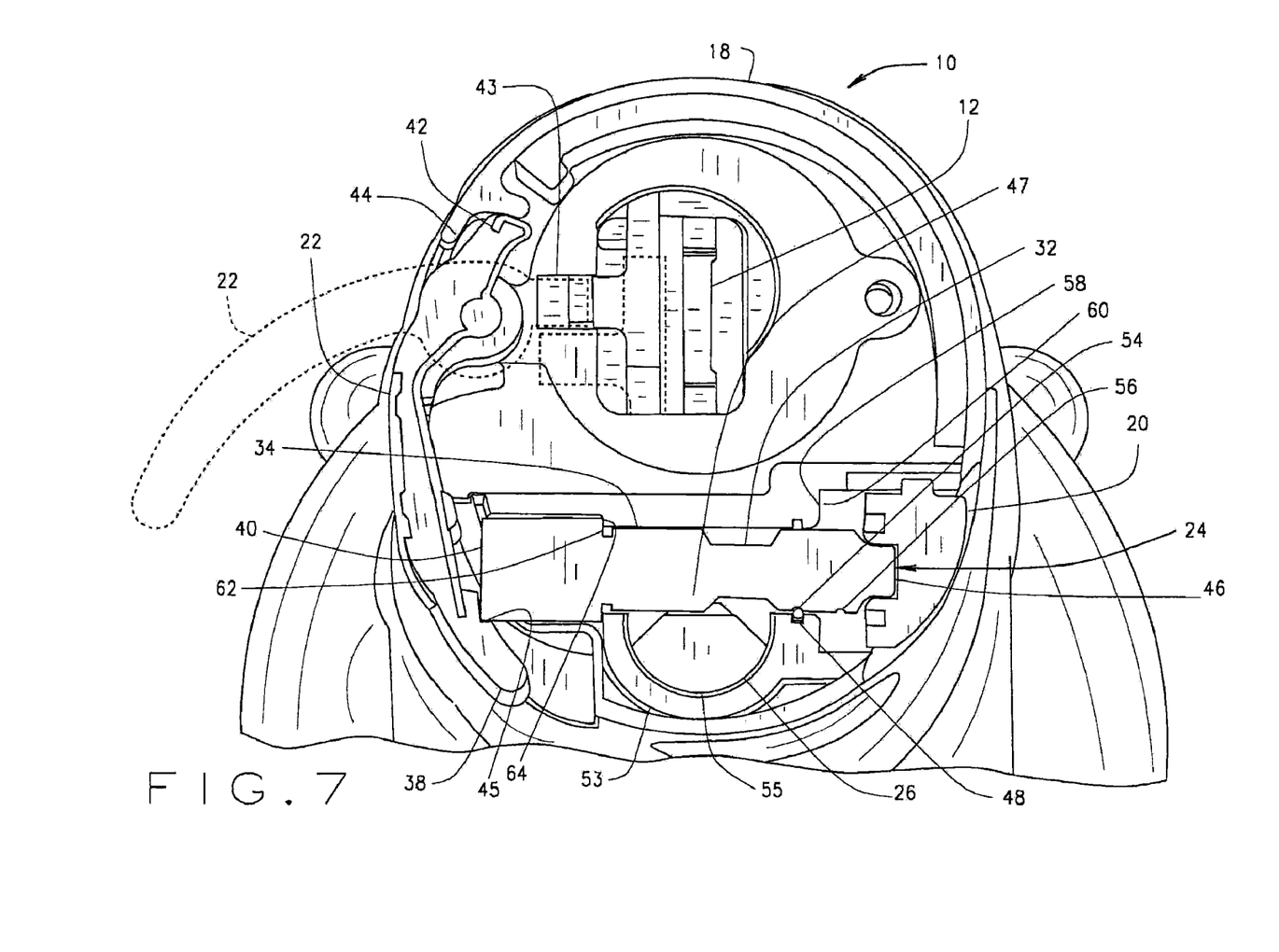
FIG. 7 is a cross-sectional view similar to FIG. 6, further illustrating in phantom the clamping lever rotated to an unclamped position for removal or replacement of the blade.

In FIG. 7, the clamping lever is represented in phantom lines rotated clockwise to an unclamped position. In this position, the blade 12 can be removed from the blade clamping arrangement. The locking pin 24 remains in its locked position.

With reference to FIGS. 1 and 2, on the housing a button 20 is also shown that may be included to unlock the shoe 14. Likewise, FIG. 2 shows the reciprocating saw 10 with a clamping lever 22 for both (un)clamping the blade 12 and (un)locking the shoe 14. As shown on FIGS. 1 and 2, the button 20 may preferentially be disposed opposite the lever 22 on the housing 18. Thus, as shown in FIG. 6, when the clamping lever 22 is in the depressed position the shoe support bar shoulders 30 and pin shoulders 34 cooperate to prevent the support bar 26 from moving relative to the housing 18 and blade 12. Accordingly, the shoe 14 is locked firmly in place thereby allowing the operator to use the shoe 14 to accurately guide the saw 10 along the work piece.

Further in the exemplary embodiment illustrated, a detent 48 is provided in the housing 18 to positively locate the pin 24. An alignment channel 53 within the tool housing 18 may include the detent 48 as shown. Along with the detent 48, the tool 10 includes a small groove 54 on the pin 24 for engaging the detent 48 when the groove 54 and detent 48 are aligned. More particularly, the detent 48 may be positioned so that when the locking pin 24 is in the locked position (barring movement of the support bar 26) the detent 48 engages the groove 54 as shown in FIG. 6. Likewise another small groove 56 may be positioned to engage the detent 48 when the locking pin 24 is in the unlocked position. Accordingly, the detent 48 positively locates the locking pin in both the locked and unlocked positions. In one alternative aspect, the pin 24 includes the detent and the housing includes the detent grooves 54 and 56. Nonetheless, the detent 48 serves to positively locate the pin 24 in the locked and unlocked positions respectively.

Note that in one exemplary embodiment the locked and the unlocked positions of the locking pin 24 are about 4 millimeters apart. It should also be noted that the alignment channel 53 also defines a track 55 for the support bar 26 to translate along. Moreover, the detent 48 may be configured in a conventional manner to retain the locking pin 24 in either position until a predetermined force acts in either direction on the locking pin 24. Moreover, the detent 48 may be configured in a conventional manner to audibly click when it engages a groove. Thus, the operator may listen for an audible click to confirm a change in position of the locking pin 24. Note should also be made that including the track 55 (for the support bar 26) and the grooves 54 and 56 on the alignment channel 53 minimizes tolerance stack that might otherwise interfere with the ability of the detent 48 to positively locate the locking pin 24.

In the alternative, or additionally, a pair of hard stops may be provided to prevent over travel of the locking pin 24. In particular, face 58 of the housing 18 may abut an opposing face 60 on the button 20 when the locking pin 24 is in the unlocked position. Note that button 20 may be affixed to the distal end 46 of the locking pin 24. Likewise, opposing faces 62 and 64 (on the locking pin 24 and housing 18 respectively) may abut each other when the locking pin is in the locked position to prevent travel beyond the locked position.

When an operator wishes to use the reciprocating saw 10, he may first place a blade 12 in the housing 18 and adjust the height of the shoe 14 as may be desired. The operator then moves the lever 22 from the unclamped and unlocked position, discussed in U.S. Pat. No. 6,502,317, to the clamped and unlocked position shown in FIG. 5. As the lever 22 moves down, the lever clamps the saw blade 12 in place via the biasing mechanism. As the operator continues pushing down on the lever 22 with one hand, the lever 22 moves from the clamped and unlocked position toward the depressed position shown in FIG. 6.

As the lever 22 moves toward the proximal end 40 of the locking pin 24, the recess 45 engages the proximal end 40 of the locking pin 24. Accordingly, the lever 22 urges the pin 24 to move so that the locking pin shoulder 34 engages the support bar shoulders 30 via one of the grooves 28 thereby locking the shoe 14 at a pre-selected height. In the meantime, the detent 48 disengages from the groove 56 as the locking pin 24 begins to move. It then engages the groove 54 to positively locate the locking pin 24 in the locked position. The operator may then use the saw 10 to cut a work piece to a desired shape.

When the operator desires to change the height of the shoe 14 the operator presses on the button 20. In turn, the button 20 urges the distal end 46 of the locking pin 24 back to the left as shown in FIG. 5 and FIG. 6. This causes the shoulders 30 and 34 to disengage and the detent 48 to disengage from the groove 54. As the button 20 is pushed further, the detent engages groove 56 to positively locate the locking pin 24 in the unlocked position. Additionally, the locking pin 24 engages the recess 45 to push the lever 22 from the clamped and locked, or depressed, position. Thus, the operator may unlock the shoe 14 with one hand (via the button 20) without disturbing the saw blade 12. Then the operator may then adjust the height of the shoe 14 by translating the shoe 14 up or down, thereby causing the shoe support shoulder 30 to translate through the pin groove 32. When one of the support bar grooves 28 aligns with the pin groove 32, the operator then relocks the locking pin 24 with lever 22.

In the alternative, the operator may wish to remove or replace the saw blade 12 without altering the shoe height. In these cases the operator may pull up on the lever 22 thereby disengaging the recess 45 from the proximal end 40 of the locking pin 24. Because the detent 48 positively locates the locking pin 24 in the locked position, the locking pin 24 remains motionless when the lever 22 moves up and away from the locking pin 24. Accordingly, the shoe 14 remains locked and will not move. Thus, the operator simply lifts the lever 22 all the way to the unclamped and unlocked position to unclamp the saw blade 12 without disturbing the shoe 14 height. Therefore, the operator may unclamp the saw blade 12 with one hand (via the lever 22) without disturbing the shoe height.

Where both unlocking and unclamping is desired (as shown in phantom in FIG. 7), simply depressing the button 20 and lifting up on the lever 22 accomplishes both desired actions. In one aspect, the button 20 is place close enough to the lever 22 on the housing 18 such that the operator can reach the button 20 and the lever 22 with one hand to accomplish the unlocking and unclamping. In other words, the operator may use one hand only, by pushing the button 20 with a thumb and lifting on the lever 22 with the fingers of the same hand. In one particular application, the button 20 is disposed on the housing 18 opposite the lever 22 to facilitate manipulation of both the button 20 and the lever 22 with one hand.

In the exemplary embodiment illustrated, the lever 22 is movable between the three stable positions. Those skilled in the art, however, will realize that the subject invention is not so limited. In certain applications, the lever position for releasing the blade may be an unstable position, for example.

Thus, one skilled in the art will recognize that the present invention provides many advantages over the prior art. For instance, an operator may both (un)clamp the saw blade and (un)lock the shoe with one hand. Therefore, reciprocating saws in accordance with the present invention are convenient to use. For similar reasons, the invention reduces the downtime associated with adjusting the height of the shoe thereby representing a labor and cost savings over the prior art. Additionally, the present invention provides positive indication of the state (locked or unlocked) of the shoe. Accordingly, scrapped work pieces that arise from attempting to saw with an unlocked shoe are reduced by the present invention. Thus, a superior reciprocating saw has been provided. Moreover, because the components (pins and bars with easily machined grooves) provided by the present invention are relatively simple, the locking mechanisms provided are correspondingly easy and inexpensive to manufacture.

Figure 8:
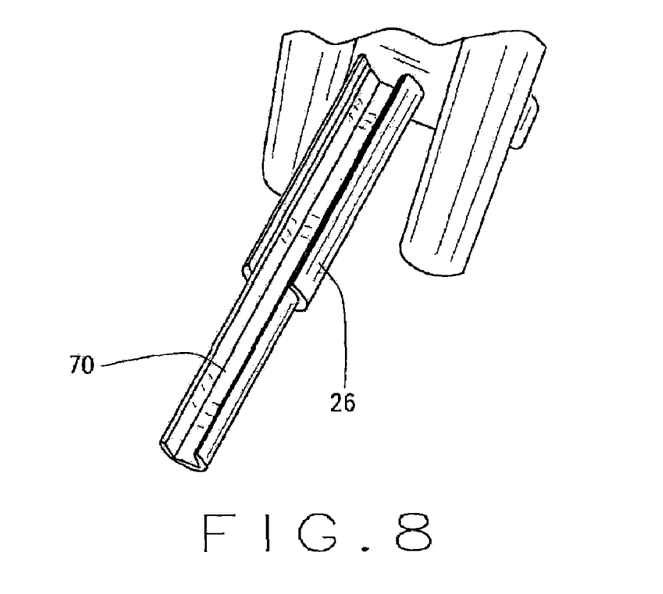
FIG. 8 is a perspective view of a support post for an adjustable shoe assembly according to the present teachings, illustrating a keyway on the support post.
Figure 9:
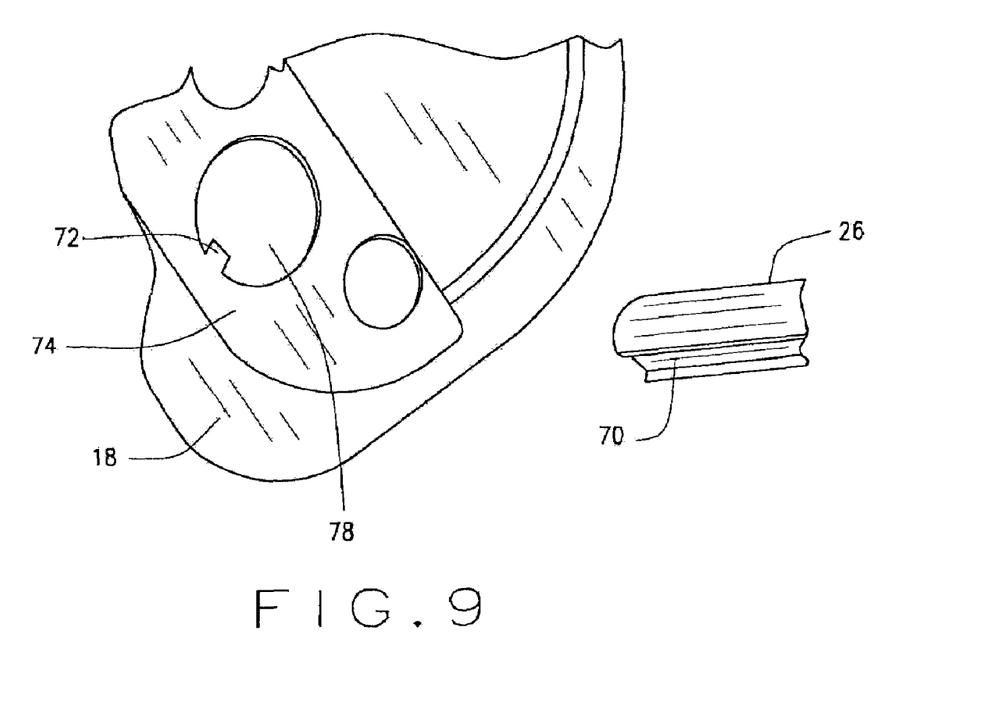
FIG. 9 is a perspective partially exploded view of a front support plate and support post for an adjustable shoe assembly according to the present teachings, illustrating a mating key and keyway.
Figure 10:
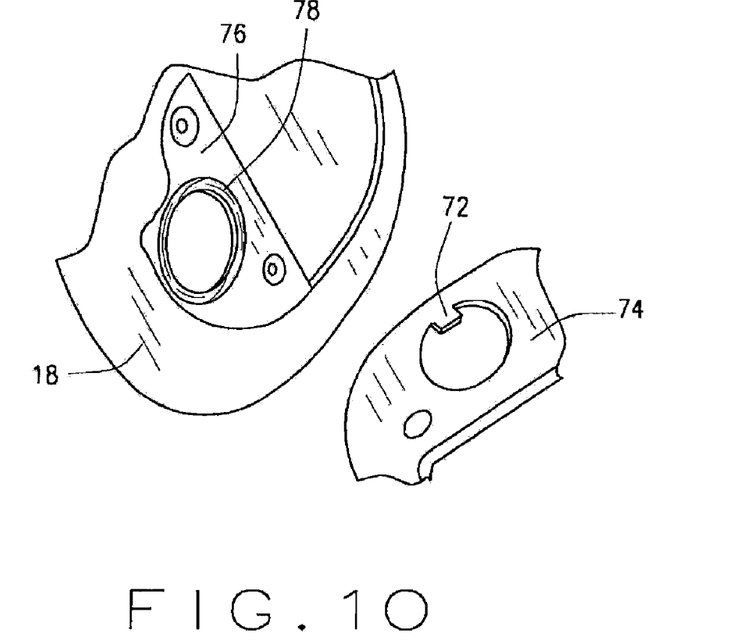
FIG. 10 is partially exploded view of a housing illustrating an O-ring between front and back support plates according to the present teachings.
Figure 11:
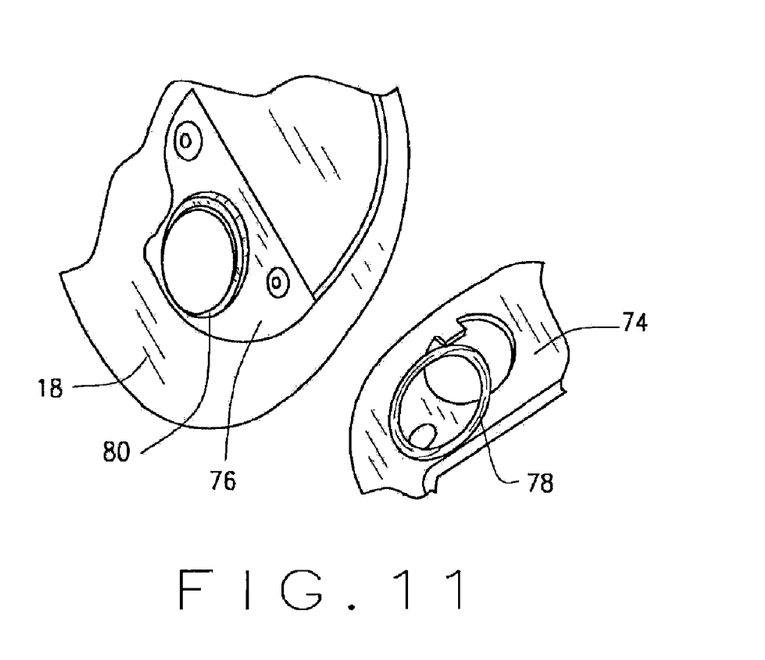
FIG. 11 is another partially exploded view of the housing of FIG. 10, illustrating the O-ring

Referring to FIGS. 8-10, the shoe support bar 26 can include a longitudinal notch that defines a longitudinal keyway 70. The keyway 70 is adapted to receive a key 72 extending from a front support plate 74 that is mounted on the housing 18 over a back support plate 76. The key 72 can be a tab or tongue made of sheet metal and can have a rectangular, curved or other geometric shape that conforms to the shape of the keyway 70. The key 72 and keyway 70 cooperate with minimal or reduced clearance, such that reduced rotational looseness or play results while the position of the shoe 14 is adjusted. Additionally, an O-ring or other frictional seal 78 can be inserted in a groove 80 between the back support plate 76 and the front support plate 74, such that the O-ring 78 provides a frictional drag or resistance as the support bar 26 is moved between positions for adjustment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shoe locking mechanism in combination with a reciprocating saw including a saw blade, the shoe locking mechanism comprising:

a housing having a body adapted to accept the blade;

a shoe selectively adjustable in position relative to the blade, the shoe defining a shoe shoulder;

a lock pin including a pin body having a first cylindrical portion at a reduced circumference section of the pin body that defines a first diameter and defines a clearance thereat, and a pin shoulder adjacent the reduced circumference section, the pin shoulder defining a second cylindrical portion defining a second diameter, wherein the first diameter is less than the second diameter, the lock pin further defining a first groove and a second groove; and wherein the lock pin is moveable between a locked position wherein the pin shoulder engages the shoe shoulder whereby the shoe is locked relative to the body, and an unlocked position whereby the shoe shoulder may translate through the clearance, wherein structure fixed with the housing selectively engages and positively locates one of the first and second grooves in the locked position and the other of the first and second grooves in the unlocked position.

2. The shoe locking mechanism of claim 1 wherein the shoe shoulder includes a plurality of shoe shoulders formed on a longitudinal portion extending from the shoe.

3. The shoe locking mechanism of claim 2 wherein the lock pin is adapted to translate in a direction generally transverse relative to a longitudinal axis of the longitudinal portion of the shoe.

4. The shoe locking mechanism of claim 3 wherein each of the plurality of shoe shoulders defines a generally flat surface on the longitudinal portion of the shoe.

5. The shoe locking mechanism of claim 3, further comprising:

a button disposed on an exterior of the housing for urging the lock pin toward the unlocked position.

6. The shoe locking mechanism of claim 1 wherein the lock pin further defines a third cylindrical portion having a third diameter wherein the first cylindrical portion is bound by the second and third cylindrical portions and wherein the first diameter is less than the third diameter.

7. The shoe locking mechanism of claim 1 wherein the first and second grooves are defined on the pin shoulder.

8. The reciprocating saw of claim 1 wherein the structure comprises a detent included on the housing.

9. A reciprocating saw having a blade and comprising:

a housing;

a drive shaft mounted to the housing for reciprocating motion;

a body adapted to accept the blade;

a shoe selectively adjustable in position relative to the blade, the shoe defining a shoe engaging portion;

a lock pin including a pin body having a first cylindrical portion at a reduced circumference section of the pin body that defines a first diameter and defines a clearance thereat, and a pin engaging portion adjacent the reduced circumference section that defines a first pin shoulder, the first pin shoulder defining a second cylindrical portion defining a second diameter, wherein the first diameter is less than the second diameter, the lock pin further defining a first groove and a second groove; and wherein the lock pin is moveable between a locked position whereat the pin engaging portion engages the shoe engaging portion whereby the shoe is locked relative to the body, and an unlocked position whereat the shoe engaging portion may translate through the clearance, wherein structure fixed with the housing selectively engages and positively locates one of the first and second grooves in the locked position and the other of the first and second grooves in the unlocked position.

10. The reciprocating saw of claim 9 wherein the shoe engaging portion defines at least one shoe shoulder.

11. The reciprocating saw of claim 10 wherein the at least one shoe shoulder includes a plurality of shoe shoulders formed on a longitudinal portion extending from the shoe.

12. The reciprocating saw of claim 11 wherein the lock pin is adapted to translate in a direction generally transverse relative to a longitudinal axis of the longitudinal portion of the shoe.

13. The reciprocating saw of claim 12 wherein each of the plurality of shoe shoulders defines a generally flat surface on the longitudinal portion of the shoe.

14. The reciprocating saw of claim 9, further comprising a button disposed on an exterior of the housing for urging the lock pin toward the locked position.

15. The reciprocating saw of claim 9 wherein the pin engaging portion defines a second pin shoulder that defines a third cylindrical portion having a third diameter wherein the first cylindrical portion is bound by the second and third cylindrical portions and wherein the first diameter is less than the third diameter.

16. The reciprocating saw of claim 9 wherein the first and second grooves are defined on the first pin shoulder.

17. The reciprocating saw of claim 9 wherein the structure comprises a detent included on the housing.

* * * * *